(12) United States Patent
Lee

(10) Patent No.: US 8,170,739 B2
(45) Date of Patent: May 1, 2012

(54) PATH GENERATION ALGORITHM FOR AUTOMATED LANE CENTERING AND LANE CHANGING CONTROL SYSTEM

(75) Inventor: Jin-Woo Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 883 days.

(21) Appl. No.: 12/143,439

(22) Filed: Jun. 20, 2008

(65) Prior Publication Data
US 2009/0319113 A1 Dec. 24, 2009

(51) Int. Cl.
*G01C 21/00* (2006.01)
(52) U.S. Cl. ............... 701/25; 701/23; 701/28; 701/41; 701/116; 701/466; 701/500; 701/519; 701/300; 701/302; 340/435; 340/436
(58) Field of Classification Search .................. None
See application file for complete search history.

(56) References Cited

U.S. PATENT DOCUMENTS

| | | | | |
|---|---|---|---|---|
| 5,350,912 A | * | 9/1994 | Ishida | 250/202 |
| 5,521,579 A | * | 5/1996 | Bernhard | 340/438 |
| 6,002,983 A | * | 12/1999 | Alland et al. | 701/301 |
| 6,338,022 B1 | * | 1/2002 | Shinmura et al. | 701/301 |
| 6,353,788 B1 | * | 3/2002 | Baker et al. | 701/96 |
| 6,480,769 B1 | * | 11/2002 | Kageyama | 701/23 |
| 6,675,094 B2 | * | 1/2004 | Russell et al. | 701/301 |
| 7,778,742 B2 | * | 8/2010 | Kuge et al. | 701/1 |
| 7,844,384 B2 | * | 11/2010 | Seto | 701/96 |
| 7,893,819 B2 | * | 2/2011 | Pfeiffer et al. | 340/435 |
| 2001/0018641 A1 | * | 8/2001 | Kodaka et al. | 701/301 |
| 2002/0156581 A1 | * | 10/2002 | Matsuura | 701/301 |
| 2004/0193351 A1 | * | 9/2004 | Takahashi et al. | 701/70 |
| 2004/0193374 A1 | * | 9/2004 | Hac et al. | 701/301 |
| 2005/0060071 A1 | * | 3/2005 | Winner | 701/36 |
| 2005/0125155 A1 | * | 6/2005 | Kudo | 701/301 |

(Continued)

FOREIGN PATENT DOCUMENTS
JP 03-268109 A 11/1991
(Continued)

OTHER PUBLICATIONS

Hatipoglu, Cem et al., "Automated Lane Change Controller Design", IEEE Transactions on Intelligent Transporation Systesm, vol. 4, No. 1., Mar. 2003, pp. 13-22.

*Primary Examiner* — Jonathan M Dager
(74) *Attorney, Agent, or Firm* — John A. Miller; Miller IP Group, PLC

(57) ABSTRACT

A system for providing path generation for automated lane centering and/or lane changing purposes. The system includes a desired path generation processor that receives signals detecting the roadway on which the vehicle is traveling, a request for a lane change, vehicle state information and a steering angle of the vehicle. The system also includes a path prediction processor that predicts the vehicle path based on vehicle state information including vehicle longitudinal speed, vehicle lateral speed, vehicle yaw-rate and vehicle steering angle. The desired path information and the predicted path information are compared to generate an error signal that is sent to a lane change controller that provides a steering angle signal to turn the vehicle and reduce the error signal. The desired path generation processor can use a fifth order polynomial equation to determine the desired path of the vehicle based on the input signals.

19 Claims, 4 Drawing Sheets

U.S. PATENT DOCUMENTS

| | | | |
|---|---|---|---|
| 2005/0155808 A1* | 7/2005 | Braeuchle et al. | 180/402 |
| 2005/0228588 A1* | 10/2005 | Braeuchle et al. | 701/301 |
| 2005/0246101 A1* | 11/2005 | Courtenay et al. | 701/301 |
| 2006/0009910 A1* | 1/2006 | Ewerhart et al. | 701/301 |
| 2006/0155444 A1 | 7/2006 | Lee et al. | |
| 2006/0178789 A1* | 8/2006 | Kuge | 701/1 |
| 2006/0261936 A1* | 11/2006 | Widmann et al. | 340/435 |
| 2007/0018801 A1* | 1/2007 | Novotny et al. | 340/435 |
| 2007/0150196 A1* | 6/2007 | Grimm | 701/301 |
| 2007/0282513 A1* | 12/2007 | Michi et al. | 701/96 |
| 2008/0043099 A1* | 2/2008 | Stein et al. | 348/118 |
| 2008/0300788 A1* | 12/2008 | Kanaboshi et al. | 701/301 |

FOREIGN PATENT DOCUMENTS

| | | |
|---|---|---|
| JP | 03-268110 A | 11/1991 |
| JP | 07-105498 A | 4/1995 |

* cited by examiner

PATH GENERATION ALGORITHM FOR AUTOMATED LANE CENTERING AND LANE CHANGING CONTROL SYSTEM

BACKGROUND OF THE INVENTION

1. Field of the Invention

This invention relates generally to a system and method for providing path generation for lane centering and lane changes in an autonomously driven vehicle and, more particularly, to a system and method for providing path generation for lane centering and lane changing in an autonomously driven vehicle that considers vehicle motion control.

2. Discussion of the Related Art

The operation of modern vehicles is becoming more autonomous, i.e., the vehicles are able to provide driving control with less and less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems intervene if the driver makes harsh steering changes that may affect vehicle stability. Some vehicle systems attempt to maintain the vehicle near the center of a lane on the road. Further, fully autonomous vehicles have been demonstrated that can drive in simulated urban traffic up to 30 mph, observing all of the rules of the road.

As vehicle systems improve, they will become more autonomous with the goal being a completely autonomously driven vehicle. For example, future vehicles probably will employ autonomous systems for lane changing, passing, turns away from traffic, turns into traffic, etc. As these systems become more prevalent in vehicle technology, it will also be necessary to determine what the drivers role will be in combination with these systems for controlling vehicle speed and steering, and overriding the autonomous system.

Smooth maneuvering and automated lane centering and lane changing control is important for driver and passenger comfort in autonomous vehicles. However, as a result of sensor and actuator latency, measured vehicle states may be different from actual vehicle states. This difference may cause improper path generation, which will affect lane changing harshness. Therefore, what is needed is a system and method for providing smooth maneuvering for lane centering and lane changing in an autonomous or semi-autonomous vehicle that is directed towards passenger comfort.

SUMMARY OF THE INVENTION

In accordance with the teachings of the present invention, a system and method are disclosed for providing path generation for lane centering and/or lane changing purposes in an autonomous or semi-autonomous vehicle. The path generation system includes a desired path generation processor that receives signals detecting the roadway on which the vehicle is traveling, a request for a lane change and a steering angle of the vehicle. The system also includes a path prediction processor that predicts the vehicle path for the next few seconds of time based on vehicle state information including vehicle longitudinal speed, vehicle lateral speed, vehicle yaw-rate vehicle steering angle. The desired path information and the predicted path information are compared to generate an error signal that is sent to a lane change adaptive cruise control (LXACC) system that provides a steering angle signal to turn the vehicle and reduce the error signal. The steering angle signal is sent to a vehicle steering control sub-system that steers the vehicle, and provides measurements of vehicle states that are used by the path prediction processor. In one embodiment, the desired path generation processor uses a fifth order polynomial equation to determine the desired path of the vehicle based on the inputs.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing path generation for smooth lane centering or lane changing in an autonomous or semi-autonomous vehicle is merely exemplary in nature, and is in no way intended to limit the invention or its applications or uses.

Figure 1:
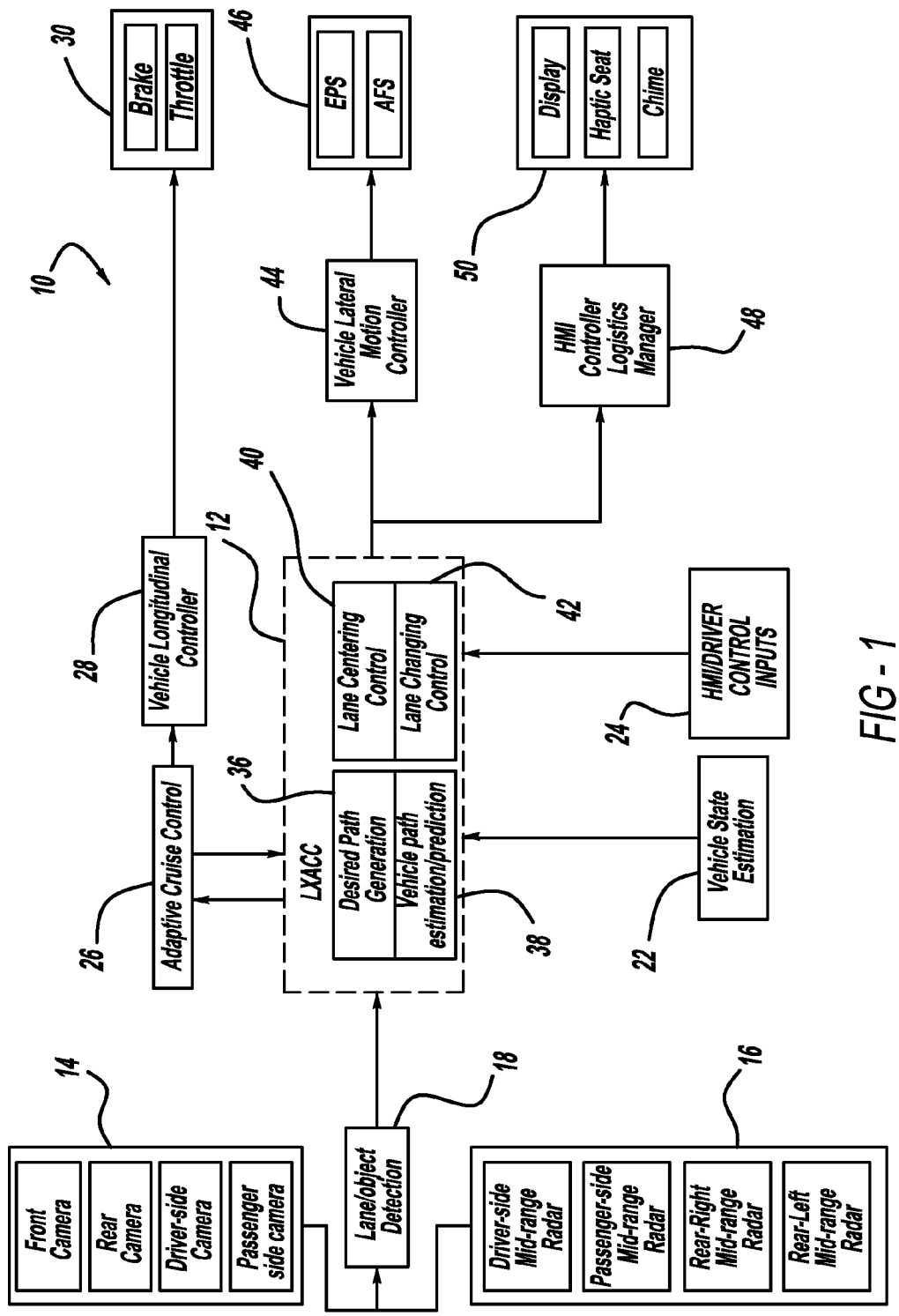
FIG. 1 is a schematic block diagram of various systems and sub-systems in an autonomous or semi-autonomous vehicle, including an LXACC system.

FIG. 1 is an illustration of a vehicle system 10 including an LXACC core algorithm 12 that includes path generation, as will be discussed in detail below. Known LXACC systems provide a unified framework for automated lateral motion controls, such as automated lane changing and lane centering functions. Because the lateral dynamics of a vehicle is related to its longitudinal motion, the longitudinal motion control is usually considered in the same framework.

The system 10 includes various cameras 14 and various radar devices 16 that detect lane marks and objects. This information is provided to a lane and object detection processor 18 that combines the detected objects and lane information. The lane and object detection information is provided to the LXACC core algorithm 12. Additionally, vehicle state estimation information at box 22 is also provided to the LXACC core algorithm 12, such as vehicle yaw rate, vehicle heading angle, vehicle speed, etc. Human machine interface (HMI)/driver control inputs at box 24 are provided to the LXACC core algorithm 12 for providing driver commands. Signals from an adaptive cruise control (ACC) sub-system 26 are provided to the LXACC core algorithm 12 and signals from the LXACC core algorithm 12 are provided to the ACC sub-system 26. The ACC sub-system 26 provides adaptive cruise control signals to a vehicle longitudinal controller 28 that in turn controls vehicle braking and throttle at box 30.

The LXACC core algorithm 12 includes a desired path generation processor 36 that generates a desired vehicle path, and is the subject of the present invention, as will be discussed in detail below. The LXACC core algorithm 12 also includes a vehicle path estimation and prediction processor 38 that estimates a vehicle path. Signals from the processors 36 and 38 are provided to lane centering control at box 40 and lane changing control at box 42. The vehicle control signals from the LXACC core algorithm 12 are provided to a vehicle lateral motion controller 44 that controls an active front steering (AFS) or electrical power steering (EPS) at box 46. Further, the lane centering control and lane changing control signals are provided to an HMI controller and logistics manager 48 to inform the driver of the LXACC status using a display unit, haptic seat or warning chimes at box 50.

The path planning produces an achievable desired path for smooth lane changing maneuvers. The motion controller uses the predicted lateral offsets and vehicle heading angles, and compares them with the desired trajectory at multiple look-ahead points. The controller generates the steering angle command at each time step. A forward vision camera is used for the lane mark detection. The lateral offset and the vehicles heading angle with respect to the current lane are obtained by processing the lane marks recognized, and further predicted over the pre-defined lane change operation time. Several inertial sensors, such as rate gyros and accelerometers, can be combined with the vision camera to estimate the vehicles motion states, such as yaw-rate and lateral speed, as well as to improve the estimation of the lateral offset and the heading angle.

The smoothness of the lateral motion is one important measure of the LXACC core algorithm 12 performance. The path-planning function generates the desired paths. The paths should satisfy the vehicles dynamic capability and be smooth. The design consideration proposed herein is to generate the desired path without an abrupt change in the sense of the vehicles second order dynamic motion. Further complication in the path planning is that the vehicle will reach the target state from any initial state. There are many approaches in the literature to solve this problem, which are based on different assumptions about the hardware and the environment.

Figure 2:
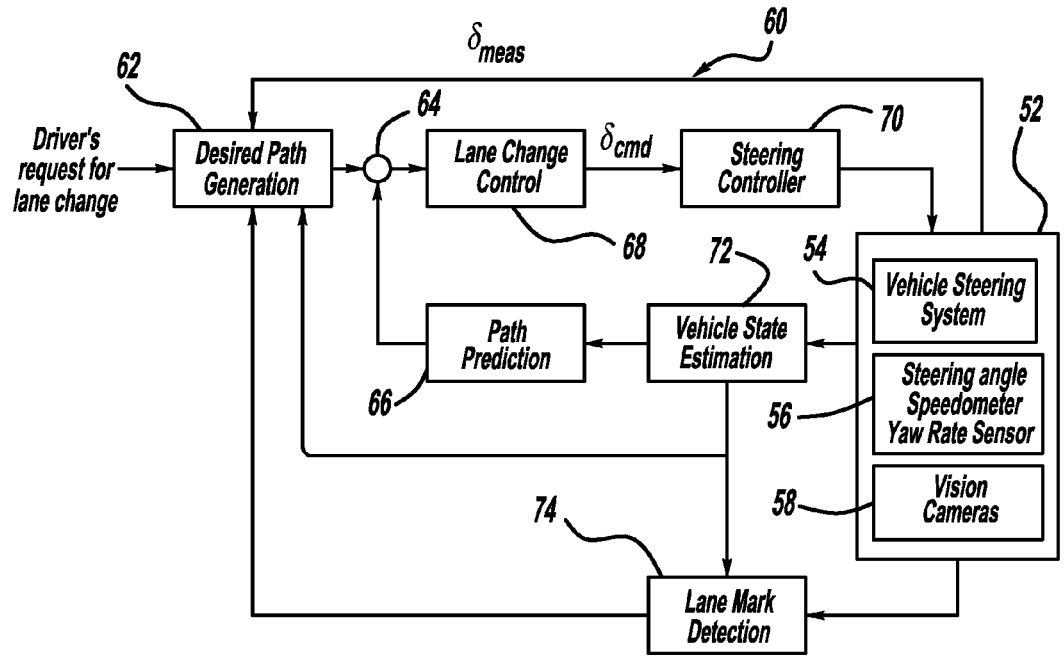
FIG. 2 is a block diagram of a path prediction system used in the LXACC system shown in FIG. 1.

FIG. 2 is a schematic block diagram of an LXACC system 60 that provides a desired path for the vehicle to follow when changing lanes, either on a straight road or a curved road, and that provides lane centering in an autonomous or semi-autonomous vehicle system, such as the system 10 shown in FIG. 1. The system 60 includes a desired path generation processor 62 that receives a driver's request for lane change from, for example, the inputs from the box 24 in FIG. 1. As will be discussed in detail below, the desired path generation processor 62 generates a smooth path for the vehicle when turning that does not have abrupt changes that would otherwise provide passenger discomfort. The system 60 produces a steering angle command to guide the vehicle along the generated path.

The desired path is represented as a series of lateral offsets, heading angles and longitudinal distances over a time period that the lane change will take place. This path information is provided to a comparator 64 that receives a signal from a path prediction processor 66 and provides an error signal between the desired path and the predicted path. The error signal is applied to a lane change controller 68 that provides a steering angle command signal $\delta_{cmd}$ for the lane change. The lane change controller 68 generates a sequence of future steering angle commands that minimize the orientation and offset errors between the vehicles desired path and the predicted vehicle path.

The steering angle command signal $\delta_{cmd}$ is then sent to a steering controller 70 that provide the steering control signal to a vehicle steering system 54 on a vehicle 52. As the vehicle turns, various sensors 56 on the vehicle, such as a steering angle sensor, speedometer and yaw rate sensor, provide measured signals of the vehicle motion. These measured vehicle motion signals $\delta_{meas}$ are sent back to the desired path generation processor 62. The vehicle 54 also includes vision devices 58, such as cameras. The vehicle motion information is provided to a vehicle state estimation processor 72 that provides estimated vehicle state signals, namely, vehicle longitudinal speed, vehicle lateral speed and vehicle yaw-rate. The vehicle state estimation processor 72 uses a vehicle model to filter the estimated vehicle state signals. The state signals are sent to the path prediction processor 66 that will be able to predict the vehicle path for the next few instances in time based on that information. The path prediction processor 66 estimates the vehicle future path based on the current vehicle speed, yaw-rate and steering angle.

The camera signals from the vision devices 58 and the filtered sensor signals from the processor 72 are provided to a lane mark detection processor 74 that corrects the parameters of the lane markings from the devices 58 based on the motion of the vehicle. The lane mark detection processor 74 recognizes the lane marking and represents them with the parameters of lane curvature, tangential angle and lateral offset, where the output of the lane marked detection processor 74 is a heading angle and curvature of the road. The position of the lane markings relative to the vehicle is then sent to desired path generation processor 62 to provide the desired path generation updating. The path generation processor 62 generates a smooth desired path for a lane change according to the vehicle dynamics and the detected lane marks.

Figure 3:
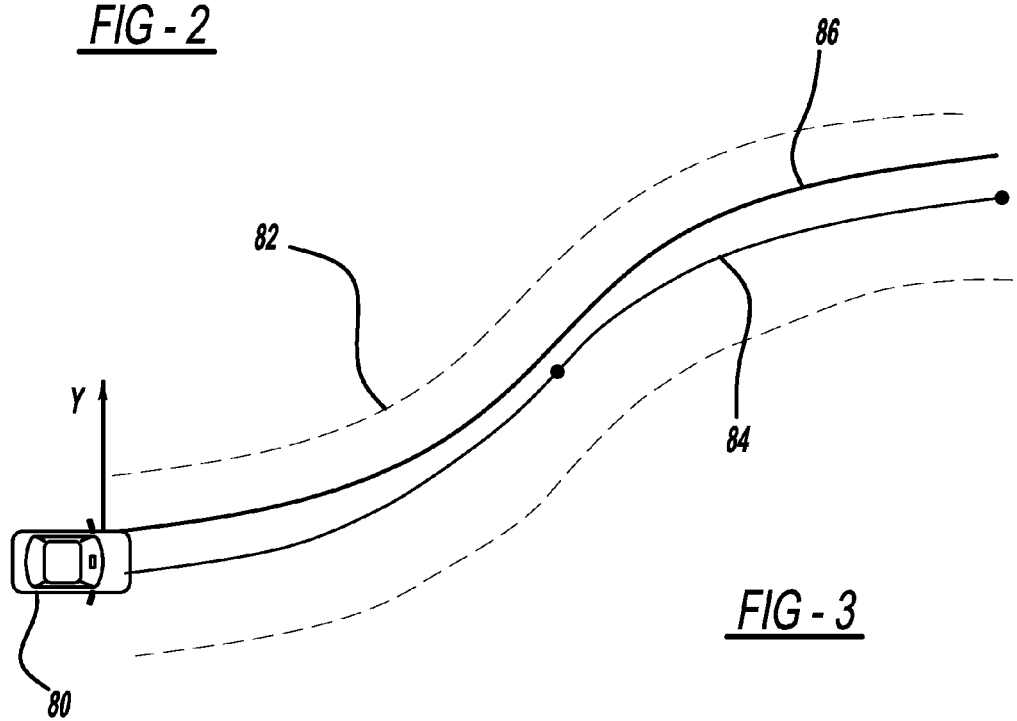
FIG. 3 is an illustration of a vehicle traveling on the roadway showing a predicted lane center and a detected lane center.

FIG. 3 is an illustration of a vehicle 80 traveling on a roadway 82 showing a detected lane center 84 that is identified by the vehicle cameras and other sensors, and a predicted lane center 86 that is generated by the path prediction processor 66. The latency of the detector and the steering actuator causes a discrepancy between the measured vehicle states and the actual vehicle states. The following discussion provides a description as to how the path prediction processor 66 predicts the path of the vehicle, and then how that predicted path is used to generate the error signal between the predicted path 86 and the detected lane center 84, as discussed above.

There are certain situations where multiple paths need to be predicted if an obstacle, such as another vehicle, is detected in the path of the vehicle 80. The present invention treats that situation in multiple segments where a first segment is from the vehicle 80 to the obstacle and a second segment is from the obstacle and beyond. The present invention provides continuity between the segments to avoid abrupt changes in vehicle motion.

According to one embodiment of the present invention, the path generation processor 62 generates the desired path based on the predicted lane center, and uses a fifth order polynomial equation, as will be discussed in detail below. The fifth order polynomial equation has six unknowns at the beginning of the process for calculating the desired path. The normalized path problem is independent of the vehicle states, where the vehicle states will be used at the stage of the coordinate conversion for normalized coordinates to vehicle coordinates. The continuity requirement for the segment can be easily accommodated into the algorithm when multiple segments need to be concatenated.

Figure 4:
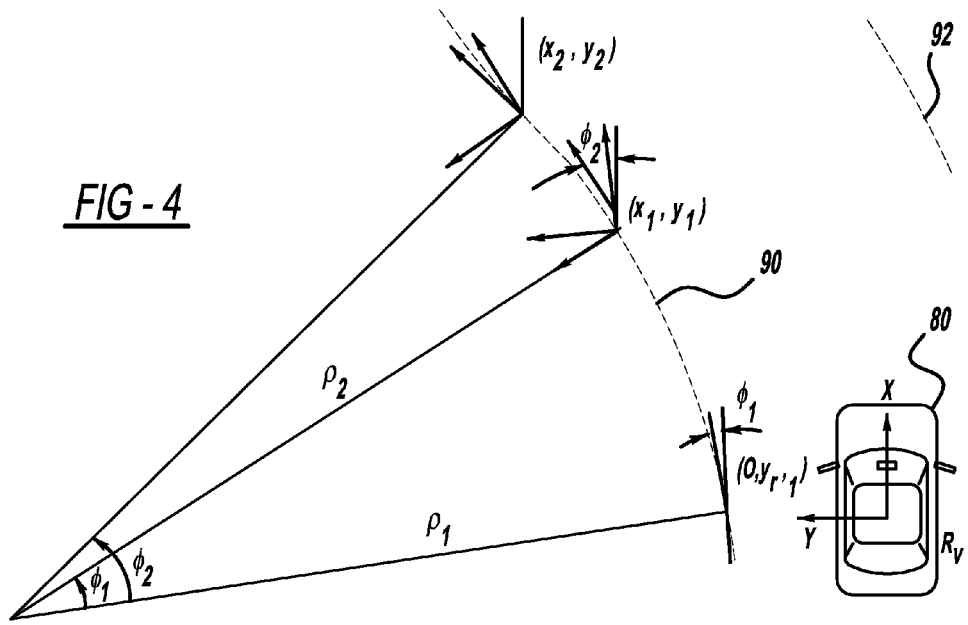
FIG. 4 is an illustration of a vehicle traveling on a roadway showing various vehicle parameters.

The vehicle 80 is equipped with a forward vision camera that detects lane marks of the roadway 82 and represents the lane marks in polynomial equations. The vision system is responsible for recovering estimates of the position and orientation of the lane with respect to the center of the vehicle. FIG. 4 shows the vehicle 80 traveling on a curve 90 of a roadway 92. The roadway 92 is modeled as two segments of second order polynomial equations as:

$$y_{seg1}(x) = A_1 x^2 + B_1 x + C_1, \quad 0 < x < x_1 \quad (1)$$

$$y_{seg2}(x) = A_2 x^2 + B_2 x + C_2, \quad 0 < x < x_2 \quad (2)$$

Where $x_1$ and $x_2$ represent the end points along the x-axis of the first segment and the second segment $y_{seg1}$ and $y_{seg2}$ represents the lateral offset of the roadway with respect to the vehicle coordinate system $R_v(t)$. The measurements provided by the vision system include yaw angle $\phi_{r,1}$ of the vehicle 80 with respect to the first segment of the roadway, lateral offset $y_{r,1}$ of the vehicle's center of gravity from the lane, and roadway curvature $\rho_1$ and $\rho_2$ of the first segment and the second segment.

From the geometric relationship between roadway and the lane representation, the coefficients of equations (1) and (2) can be related as:

$$A_1 = \frac{\rho_1}{2} \quad (3)$$

$$A_2 = \frac{\rho_2}{2} \quad (4)$$

$$B_1 = \tan \varphi_1 \quad (5)$$

$$C_1 = y_{r,1} \quad (6)$$

It is assumed that the roadway runs without discontinuity, that is, the two segments of each road representation connect smoothly without an abrupt change at the transition point $x_1$. Only the zeroth and first order continuity are assumed herein, so equations (7) and (8) below hold at the transition point $x_1$.

$$y_{seg1}(x_1) = y_{seg2}(x_1) \quad (7)$$

$$\left.\frac{dy_{seg1}}{dx}\right|_{x=x1} = \left.\frac{dy_{seg2}}{dx}\right|_{x=x1} \quad (8)$$

Substituting equations (3)-(8) into equations (1) and (2) provides:

$$C_2 = y_{seg1}(x_1) \quad (9)$$

$$B_1 = 2A_1 x_1 + B_1 \quad (10)$$

By integrating equations (3)-(6), (9) and (10), equations (1) and (2) can be rewritten in terms of the measurements of the vision system as:

$$y_{seg1}(x) = \frac{\rho_1}{2} x^2 + \tan(\varphi_1) x + y_{r,1}, \quad 0 < x < x_1 \quad (11)$$

$$y_{seg2}(x) = \frac{\rho_2}{2} x^2 + (\rho_1 \cdot x_1 + \tan(\varphi_1)) x + y_{seg1}(x_1), \quad x_1 < x < x_2 \quad (12)$$

Assuming that the vehicle 80 is running at a longitudinal speed $v_x$ and there are no obstacles in the roadway, then the driver/passengers comfort depends on the vehicle's lateral acceleration $a_y$ and the lateral acceleration $a_y$ is a function of the vehicle speed $v_x$ and the steering angle $\delta$. A time variable $t_{LX}$ is specified to complete a lane change maneuver independent of vehicle longitudinal speed unless the calculated lateral acceleration $a_y$ is predicted to be over a certain limit during the lane change maneuvering. If the lateral acceleration $a_y$ is over the limit, a new path is calculated with a new extended lane change maneuvering time.

The vehicle longitudinal speed $v_x$ is measured by the vehicle speedometer, and the lateral offset, heading angle and roadway curvature $\rho$ are measured by the forward vision system. The desired path generation is formulated for the lane change maneuvering as a boundary condition problem. Assume that the lane change control begins at $t=0$ and define $(x(t),y(t))$ as the vehicle position at time t with respect to the origin $R_v(0)$ coordinate system.

Figure 5:
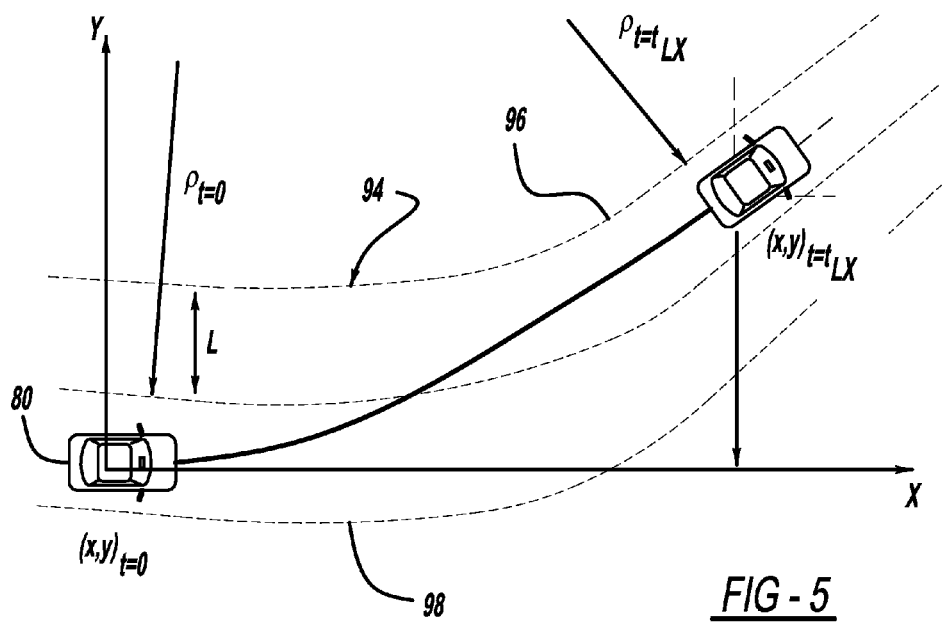
FIG. 5 is an illustration of a vehicle changing lanes around a curve.

FIG. 5 is an illustration of the vehicle 80 traveling on a roadway 94 around a curve 96, and identifies boundary conditions for the desired path generation. Note that the coordinates system $R_v(0)$ is the vehicle coordinate system captured at time $t=0$ and the position and the heading angle of the vehicle 80 at $t=0$ are aligned with $R_v(0)$. Thus $(x(t=0, y(t=0)) = (0,0)$ and $y'(0)=0$ can be set without loss of generality.

The initial and final states $(y,y',y'')_{t=0}$ and $(y,y',y'')_{t=t_{LX}}$ of the vehicle 80 can then be obtained by manipulating the roadway representation equations (11) and (12). The value $(x(t_{LX}),y(t_{LX}))$ corresponds to the desired position of the vehicle 80 at time $t=t_{LX}$, where $x(t_{LX})$ can be estimated by integrating the vehicle longitudinal speed $v_x$ and the value $y(t_{LX})$ can be obtained by the lane width and the roadway geometry. Note that $y_r$ in equations (3)-(6) represents the lateral offset of the roadway from the center of the vehicle 80, and here y represents the vehicle location with respect to $R_v(0)$.

Selecting a fifth order polynomial equation for x and y positions of the vehicle 80 gives:

$$y(x) = a_5 x^5 + a_4 x^4 + a_3 x^3 + a_2 x^2 + a_1 x + a_0 \quad (13)$$

Considering the initial and final conditions gives:

$$(y(x), y'(x), y''(x))_{t=0} = (0, 0, y''_{seg1}(x(0))) \quad (14)$$
$$\text{if } x_1 < x(t_{LX}) < x_2$$

$$(y(x), y'(x), y''(x))_{t=t_{LX}} = \quad (15)$$
$$\begin{cases} (y_{seg1}(x(t_{LX})), y'_{seg1}(x(t_{LX})), y''_{seg1}(x(t_{LX}))), & \text{if } 0 < x(t_{LX}) < x_1 \\ (y_{seg2}(x(t_{LX})), y'_{seg2}(x(t_{LX})), y''_{seg2}(x(t_{LX}))), & \text{if } x_1 < x(t_{LX}) < x_2 \end{cases}$$

The problem can be solved by the following linear equation:

$$\begin{bmatrix} a_0 \\ a_1 \\ a_2 \\ a_3 \\ a_4 \\ a_5 \end{bmatrix} = \begin{bmatrix} 1 & x(0) & x^2(0) & x^3(0) & x^4(0) & x^5(0) \\ 0 & 1 & 2x(0) & 3x^2(0) & 4x^3(0) & 5x^4(0) \\ 0 & 0 & 2 & 6x(0) & 12x^2(0) & 20x^3(0) \\ 1 & x(t_{LX}) & x^2(t_{LX}) & x^3(t_{LX}) & x^4(t_{LX}) & x^5(t_{LX}) \\ 0 & 1 & 2x(t_{LX}) & 3x^2(t_{LX}) & 4x^3(t_{LX}) & 5x^4(t_{LX}) \\ 0 & 0 & 0 & 6x(t_{LX}) & 12x^2(t_{LX}) & 20x^3(t_{LX}) \end{bmatrix}^{-1} \quad (16)$$

-continued $$\begin{bmatrix} y(x(0)) \\ y'(x(0)) \\ y''(x(0)) \\ y(x(t_{LX})) \\ y'(x(t_{LX})) \\ y''(x(t_{LX})) \end{bmatrix}$$

The path generation problem can be simplified by normalization of the coordinate. Denoting the normalized coordinates as $(x_n(t), y_n(t))$ gives:

$$x_n(t) = \frac{x(t)}{x(t_{LX})} \qquad (17)$$

$$y_n(x(t)) = \frac{y(x(t))}{y(x(t_{LX}))} \qquad (18)$$

Substituting equations (17) and (18) into equation (13) and redefining the coefficients of the polynomial equation, $y_n$ can be obtained by the following equation:

$$y_n(x_n) = a_{n,5} x_n^5 + a_{n,4} x_n^4 + a_{n,3} x_n^3 + a_{n,2} x_n^2 + a_{n,1} x_n + a_{n,0} \qquad (19)$$

Applying the normalized coordinates of equations (17) and (18) into the initial and final conditions, the normalized coordinates can be rewritten to the conditions as:

$$(y_n(x_n), y'(x_n)_n, y''(x_n)_n)_{t=0} = \left(0, 0, y''_{seg1}(x(0)) \cdot \frac{x^2(t_{LX})}{y(t_{LX})}\right) \qquad (20)$$

$$(y_n(x_n), y'(x_n)_n, y''(x_n)_n)_{t=t_{LX}} = \qquad (21)$$

$$\begin{cases} \left(1, y'_{seg1}(x(t_{LX})) \cdot \frac{x(t_{LX})}{y(t_{LX})}, \\ y''_{seg1}\left(x(t_{LX}) \cdot \frac{x^2(t_{LX})}{y(t_{LX})}\right)\right), & \text{if } 0 < x < x_1 \\ \left(1, y'_{seg2}(x(t_{LX})) \cdot \frac{x(t_{LX})}{y(t_{LX})}, \\ y''_{seg2}\left(x(t_{LX}) \cdot \frac{x^2(t_{LX})}{y(t_{LX})}\right)\right), & \text{if } x_1 < x < x_2 \end{cases}$$

The linear equation problem of equation (16) can then be simplified as:

$$\begin{bmatrix} a_{n,0} \\ a_{n,1} \\ a_{n,2} \\ a_{n,3} \\ a_{n,4} \\ a_{n,5} \end{bmatrix} = \begin{bmatrix} 1 & 0 & 0 & 0 & 0 & 0 \\ 0 & 1 & 0 & 0 & 0 & 0 \\ 0 & 0 & 2 & 0 & 0 & 0 \\ 1 & 1 & 1 & 1 & 1 & 1 \\ 0 & 1 & 2 & 3 & 4 & 5 \\ 0 & 0 & 2 & 6 & 12 & 20 \end{bmatrix}^{-1} \begin{bmatrix} y_n(0) \\ y'_n(0) \\ y''_n(0) \\ y_n(1) \\ y'_n(1) \\ y''_n(1) \end{bmatrix} \qquad (22)$$

Note that the roadway conditions are captured only by the y-vector, and the matrix is a constant matrix regardless of the initial condition, the final condition or the road geometry. Therefore, the solution of equation (22) can be obtained by a few simple algebraic computations. Once the solution is calculated, equation (19) represents the desired path to complete the current lane change maneuvering in normalized coordinates. Applying equation (18) can yield the desired path profile in the vehicle coordinates.

Recall the initial position of the vehicle $(x(t=0), y(t=0)) = (0,0)$ and the initial heading angle $y'(0)=0$ because the vehicle motion is described by the vehicle coordinate system captured at $t=0, R_v(0)$. In curved road cases, as shown in FIG. 5, the boundary conditions can be written as:

$$(y(x(0)) \; y'(x(0)) \; y''(x(0))) = (0 \; 0 \; y''_{seg}(0)) \qquad (23)$$

$$(y(x(t_{LX})) \; y'(x(t_{LX})) \; y''(x(t_{LX}))) = y_{seg}(x(t_{LX})) + L \; y'_{seg}(x(t_{LX})) \; y''_{seg}(x(t_{LX}))) \qquad (24)$$

Where L is the lane width and $x(t_{LX})$ is the x-coordinate at time $t_{LX}$ that corresponds to the longitudinal distance of travel to complete the lane change maneuvering. The value $x(t_{LX})$ can be estimated by integrating the vehicle speed $v_x$.

In normalized form, the initial and final conditions are:

$$(y_n(x_n=0) \; y'_n(x_n=0) \; y''_n(x_n=0)) = \left(0 \; 0 \; y''_{seg}(0) \cdot \frac{x^2(t_{LX})}{y(x(t_{LX}))}\right) \qquad (25)$$

$$(y_n(x_n=1) \; y'_n(x_n=1) \; y''_n(x_n=1)) = \qquad (26)$$
$$\left(1 \; y'_{seg}(x(t_{LX})) \cdot \frac{x(t_{LX})}{y(x(t_{LX}))} \; y''_{seg}(x(t_{LX})) \cdot \frac{x^2(t_{LX})}{y(x(t_{LX}))}\right)$$

Substituting equations (25) and (26) into the linear equation (22) results in the following solution:

$$a_{n,0} = a_{n,1} = 0, \; a_{n,2} = 0.5 y''_{seg}(0) \cdot \frac{x^2(t_{LX})}{y(x(t_{LX}))} \qquad (27)$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) - 0.5 y''_{seg}(0) \cdot \frac{x^2(t_{LX})}{y(x(t_{LX}))} \\ y'_n(1) - 0.5 y''_{seg}(0) \cdot \frac{x^2(t_{LX})}{y(x(t_{LX}))} \\ y''_n(1) - 0.5 y''_{seg}(0) \cdot \frac{x^2(t_{LX})}{y(x(t_{LX}))} \end{bmatrix} \qquad (28)$$

As seen in equation (28), the first two coefficients of the polynomial equation are always zero. Further the rest of the coefficients can be calculated with a few algebraic computations with the boundary conditions.

Figure 6:
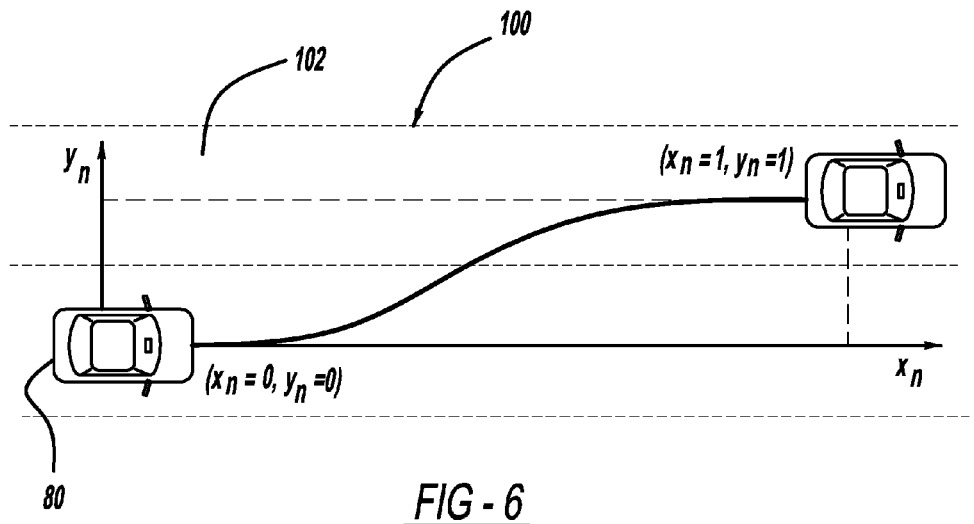
FIG. 6 is an illustration of a vehicle changing lanes on a straight roadway.

For straight road cases, the path generation problem can be further simplified. FIG. 6 is an illustration of the vehicle 80 traveling in a lane 102 of a roadway 100 that is straight. The road curvature ρ is zero throughout the lane change maneuvering and the desired heading angle at the end of the lane change will be also zero. Thus, initial and final conditions are:

$$(y(x(0)) \; y'(x(0)) \; y''(x(0))) = (0 \; 0 \; 0) \qquad (29)$$

$$(y(x(t_{LX})) \; y'(x(t_{LX})) \; y''(x(t_{LX}))) = (L \; 0 \; 0) \qquad (30)$$

Where L is the lane width.

In normalized form, the initial and final conditions can be written as:

$$(y_n(x_n=0) \; y'_n(x_n=0) \; y''_n(x_n=0)) = (0 \; 0 \; 0) \qquad (31)$$

$$(y_n(x_n=1) \; y'_n(x_n=1) \; y''_n(x_n=1)) = (1 \; 0 \; 0) \qquad (32)$$

Finally, substituting the conditions of equations (31) and (32) in the linear equation leads to the following solution:

$$a_{n,0} = a_{n,1} = a_{n,2} = 0 \quad (33)$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) \\ y'_n(1) \\ y''_n(1) \end{bmatrix} = \begin{bmatrix} 10 \\ -15 \\ 6 \end{bmatrix} \quad (34)$$

As seen in equation (34), the coefficients of the polynomial equation for the straight road are constant regardless of the lane change maneuvering distance, that is, the desired path is predetermined and no online computation is needed for the lane change maneuvering for straight road circumstances.

In the discussion above, it was assumed that the forward vision system can detect the lane marks far enough to cover the entire travel distance needed for the lane change maneuvering. This assumption may not be valid in certain cases, in particular, for high speed of vehicle motion or uneven road conditions. Considering these cases, the roadway can be extrapolated with the first order continuity assumption.

Figure 7:
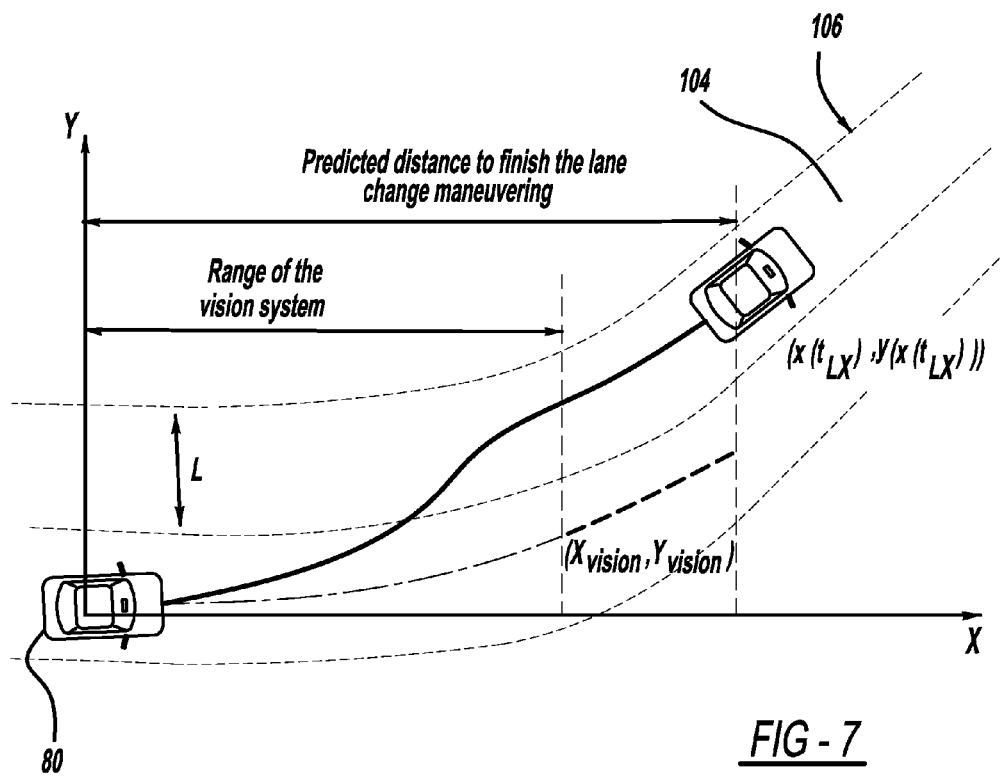
FIG. 7 is an illustration of a vehicle changing lanes on a curve in a roadway where a lane change would continue past a location where sensors in the vehicle can detect.

FIG. 7 illustrates the vehicle 80 traveling in a lane 104 of a roadway 106 showing the scenario where the range of the vision system is limited so that the vision system is not able to see the entire travel distance needed for the lane change maneuvering.

Recall the roadway representation of equations (11) and (12).

$$y_{seg1}(x) = \frac{\rho_1}{2}x^2 + \tan(\varphi_1)x + y_{r,1}, \quad 0 < x < x_1 \quad (35)$$

$$y_{seg2}(x) = \frac{\rho_2}{2}x^2 + (\rho_1 \cdot x_1 + \tan(\varphi_1))x + y_{seg1}(x_1), \quad x_1 < x < x_2 \quad (36)$$

The value $x_2$ is the end point of the second segment and corresponds to the range of the vision system. If $x_2 < x(t_{LX})$, that is the range of the vision system is shorter than the distance needed for the current lane change maneuver, then the roadway measurement can be extrapolated from $x_2$ to $x(t_{LX})$ with the first order continuity assumption. Then, the roadway 106 can be represented by the following three equations:

$$y_{seg1}(x) = \frac{\rho_1}{2}x^2 + \tan(\varphi_1)x + y_{r,1}, \quad \text{for } 0 < x < x_1 \quad (37)$$

$$y_{seg2}(x) = \frac{\rho_2}{2}x^2 + (\rho_1 \cdot x_1 + \tan(\varphi_1))x + y_{seg1}(x_1), \quad \text{for } x_1 < x < x_2 \quad (38)$$

$$y_{seg3}(x) = y'_{seg}(x_2) \cdot (x - x_2) + y_{seg}(x_2), \quad \text{for } x_2 < x < x(t_{LX}) \quad (39)$$

The first two segments are road representations based on the roadway measurement and the third segment is a virtual roadway extended with the continuity assumption. Considering the extended roadway representation, the initial and final conditions are obtained by:

$$(y(x(0)) \; y'(x(0)) \; y''(x(0))) = (0 \; 0 \; y''_{seg1}(0)) \quad (40)$$

$$(y(y(t_{LX})) \; y'(x(t_{LX})) \; y''(x(t_{LX}))) = (y'_{seg}(x_2) \cdot (x(t_{LX}) - x_2) + y_{seg2}(x_2) + L \; y'_{seg}(x_2)) 0) \quad (41)$$

Normalized coordinates gives:

$$(y_n(x_n = 0) \; y'_n(x_n = 0) \; y''_n(x_n = 0)) = \left(0 \quad 0 \quad y''_{sseg1}(0) \cdot \frac{x^2(t_{LX})}{y(x(t_{LX}))}\right) \quad (42)$$

$$(y_n(x_n = 1) \; y'_n(x_n = 1) \; y''_n(x_n = 1)) = \left(1 \quad y''_{sseg2}(x_2) \cdot \frac{x(t_{LX})}{y(x(t_{LX}))} \quad 0\right) \quad (43)$$

The polynomial coefficients of the desired path can be obtained by substituting the conditions of equations (42) and (43) into equation (28) as:

$$a_{n,0} = a_{n,1} = a_{n,2} = 0.5 y''_{seg}(0) \cdot \frac{x^2(t_{LX})}{y(x(t_{LX}))} \quad (44)$$

$$\begin{bmatrix} a_{n,3} \\ a_{n,4} \\ a_{n,5} \end{bmatrix} = \begin{bmatrix} 1 & 1 & 1 \\ 3 & 4 & 5 \\ 6 & 12 & 20 \end{bmatrix}^{-1} \begin{bmatrix} y_n(1) - 0.5 y''_{seg}(0) \cdot \frac{x^2(t_{LX})}{y(x(t_{LX}))} \\ y'_n(1) - 0.5 y''_{seg}(0) \cdot \frac{x^2(t_{LX})}{y(x(t_{LX}))} - \\ -0.5 y''_{seg}(0) \cdot \frac{x^2(t_{LX})}{y(x(t_{LX}))} \end{bmatrix} \quad (45)$$

Note that the solution of the polynomial coefficients of equation (45) is obtained with the assumption of the first order continuity at the end, which means that the roadway is assumed as a straight road without a discontinuity after the sensor range. As the vehicle moves, the uncertainty of the roadway after the sensor range disappears and the path generated with the assumption is corrected corresponding to the detected roadway information.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for determining a desired path for vehicle steering, said system comprising:

a plurality of vehicle sensors and detectors configured to detect a travel lane of a roadway that the vehicle is travelling in and providing lane identification signals;

a desired path generation processor configured to respond to the lane signals, a request for a lane change and a steering angle signal of the steering angle of the vehicle, said desired path generation processor configured to generate a desired path of the vehicle and to provide an output signal including a longitudinal distance that the lane change will take, a lateral distance that the lane change will take and an angle for the lane change;

a path prediction processor configured to respond to vehicle state signals including vehicle lateral speed, vehicle longitudinal speed, vehicle yaw-rate and steering angle, said path prediction processor configured to predict a path of the vehicle based on the lateral vehicle speed, the longitudinal vehicle speed, the vehicle yaw-rate and the steering angle, said path prediction processor configured to provide an output signal identifying the predicted path of the vehicle; and a comparator configured to compare the output signal from the desired path generation processor and the output signal from the path prediction processor and to provide an error signal of the difference between the desired path and the predicted path of the vehicle.

2. The system according to claim 1 further comprising a lane change controller configured to respond to the error signal, said lane change controller processor configured to provide the steering angle signal for steering the vehicle to minimize the error signal.

3. The system according to claim 2 further comprising a vehicle steering control sub-system configured to respond to the steering angle signal from the lane change controller, said vehicle steering control sub-system using the steering angle signal to steer the vehicle.

4. The system according to claim 3 wherein some of the vehicle sensors measure vehicle motion and provide measurement signals of vehicle speed, vehicle yaw-rate and steering angle.

5. The system according to claim 4 further comprising a vehicle state estimation processor configured to respond to the vehicle measurement signals and to provides filtered signals of the vehicle lateral speed, the vehicle longitudinal speed and the vehicle yaw-rate to the path prediction processor.

6. The system according to claim 1 further comprising a lane mark detection processor configured to respond to signals from a forward vision camera that detects lanes that the vehicle is travelling in, said lane mark detection processor configured to identify lane marks in the lanes and to provide the lane signals to the desired path generation processor.

7. The system according to claim 1 wherein the desired path generation processor is configured to determines the desired path using a fifth order polynomial equation.

8. The system according to claim 1 wherein the desired path generation processor determines the desired path as a plurality of segments if an obstacle is detected in the desired path, said segments including a first segment between the vehicle position and the obstacle and a second segment between the obstacle and the remainder of the desired vehicle path.

9. The system according to claim 1 wherein the desired path generation processor receives a lateral offset and heading angle relative to the road, and road curvature information to generate the desired path for a vehicle traveling around a curve.

10. The system according to claim 1 wherein the desired path generation processor generates the desired path as a virtual path beyond the sensor range of the sensors in the vehicle that detect the roadway.

11. A system for determining a desired path for vehicle steering an autonomous or semi-autonomous vehicle, said system comprising:
a plurality of vehicle sensors and detectors configured to detect a travel lane of a roadway that the vehicle is traveling in and providing lane identification signals, said sensors also providing measurement and motion signals of vehicle speed and vehicle yaw-rate;
a desired path generation processor configured to respond to the lane signals, a driver request for a lane change and a steering angle of the vehicle, said desired path generation processor configured to generate a desired path of the vehicle and providing an output signal including a longitudinal distance that the lane change will take, a lateral distance that the lane change will take and an angle for the lane change, said desired path generation processor configured to determine the desired path using a fifth order polynomial equation;
a path prediction processor configured to respond to vehicle state signals including vehicle lateral speed, vehicle longitudinal speed, vehicle yaw-rate and vehicle steering angle, said path prediction processor configured to predict a path of the vehicle based on the lateral vehicle speed, the longitudinal vehicle speed, the vehicle yaw-rate and the steering angle, said path prediction processor configured to provide an output signal identifying the predicted path of the vehicle;
a comparator configured to compare the output signal from the desired path generation processor and the output signal from the path prediction processor and to provides an error signal of the difference between the desired path and the predicted path of the vehicle;
a lane change controller configured to respond to the error signal, said lane change controller providing the steering angle signal for steering the vehicle to minimize the error signal; and
a vehicle steering control sub-system configured to respond to the steering angle signal from the lane change controller, said vehicle steering control sub-system using the steering angle signal to steer the vehicle.

12. The system according to claim 11 further comprising a vehicle state estimation processor configured to respond to the vehicle measurement and motion signals and to provides filtered signals of the vehicle lateral speed, the vehicle longitudinal speed, the vehicle yaw-rate and the vehicle steering angle to the path prediction processor.

13. The system according to claim 11 further comprising a lane mark detection processor configured to respond to signals from the vehicle sensors and detectors that detect lanes that the vehicle is travelling in, said lane mark detection processor configured to identify lane marks in the lanes and to provide the lane signals to the desired path generation processor.

14. The system according to claim 11 wherein the desired path generation processor determines the desired path as a plurality of segments if an obstacle is detected in the desired path, said segments including a first segment between the vehicle position and the obstacle and a second segment between the obstacle and the remainder of the desired vehicle path.

15. The system according to claim 11 wherein the desired path generation processor receives road curvature information to generate the desired path for a vehicle traveling around a curve.

16. The system according to claim 11 wherein the desired path generation processor generates the desired path as a virtual path beyond the sensor range of the sensors in the vehicle that detect the roadway.

17. A system for determining a desired path for steering a vehicle, said system comprising:
a plurality of vehicle sensors and detectors configured to detect a travel lane of a roadway that the vehicle is traveling in and providing lane identification signals;
a desired path generation processor configured to respond to the lane signals, a request for a lane change and a steering angle signal of the steering angle of the vehicle, said desired path generation processor configured to generate a desired path of the vehicle and to provide an output signal including a longitudinal distance the lane change will take, a lateral distance that the lane change will take and an angle for the lane change, said desired generation processor configured to determine the desired path using a fifth order polynomial equation, wherein the desired path generation processor is configured to receive a lateral offset and heading angle relative to the road, and road curvature information to generate the desired path for a vehicle traveling around a curve;
a path prediction processor configured to respond to vehicle state signals including vehicle lateral speed, vehicle longitudinal speed, vehicle yaw-rate and steering angle, said path prediction processor configured to predict a path of the vehicle based on the lateral vehicle speed, the longitudinal vehicle speed, the vehicle yaw-rate and the steering angle, said path prediction processor configured to provide an output signal identifying the predicted path of the vehicle; and a comparator configured to compare the output signal from the desired path generation processor and the output signal from the path prediction processor and to provide an error signal of the difference between the desired path and the predicted path of the vehicle.

18. The system according to claim 17 further comprising a lane change controller configured to respond to longitudinal distance, lateral distance and sensor angle error signals and providing the steering angle signal for steering the vehicle.

19. The system according to claim 17 further comprising a lane mark detection processor configured to respond to the signals from the vehicle sensors and detectors that detect the lane that the vehicle is traveling in, said lane mark detection processor configured to identify lane marks in the lanes and providing the lane signals to the desired path generation processor.

* * * * *